United States Patent [19]

Hashimoto et al.

[11] Patent Number: 5,190,011

[45] Date of Patent: Mar. 2, 1993

[54] KNOCKING CONTROL METHOD AND APPARATUS FOR INTERNAL COMBUSTION ENGINE

[75] Inventors: Atsuko Hashimoto; Toshio Iwata, both of Himeji, Japan

[73] Assignee: Mitsubishi Denki Kabushiki Kaisha, Tokyo, Japan

[21] Appl. No.: 769,415

[22] Filed: Oct. 1, 1991

[30] Foreign Application Priority Data

Oct. 2, 1990 [JP] Japan .................................. 2-263042
Oct. 2, 1990 [JP] Japan .................................. 2-263043

[51] Int. Cl.$^5$ ............................................... F02P 5/14
[52] U.S. Cl. ...................................... 123/425; 123/419
[58] Field of Search ......................... 123/419, 425, 435

[56] References Cited

U.S. PATENT DOCUMENTS

| | | | |
|---|---|---|---|
| 4,951,630 | 8/1990 | Iwata .................................. | 123/435 |
| 4,971,007 | 11/1990 | Gopp et al. ......................... | 123/425 |
| 5,000,149 | 3/1991 | Miyama ............................... | 123/425 |
| 5,069,183 | 12/1991 | Nagano et al. ..................... | 123/419 |
| 5,090,383 | 2/1992 | Demizu et al. ...................... | 123/425 |

*Primary Examiner*—Raymond A. Nelli
*Attorney, Agent, or Firm*—Sughrue, Mion, Zinn, Macpeak and Seas

[57] ABSTRACT

A method and an apparatus for suppressing knocking in an internal combustion engine are disclosed therein. Vibrations of the engine are detected periodically by a knocking sensor installed on the engine. Decision is made as to whether or not the vibration level as detected exceeds a predetermined value. In dependence on the result of the decision, the vibration level is averaged with a first or a second significance ratio which differ from each other and which are previously determined in consideration of variations in the vibration level brought about by degradation of the knocking sensor in the course of time lapse or by an engine operating state. A mean value obtained through the averaging processing is utilized as a basis for determining a threshold level for comparison with the vibration level for making decision as to the occurence of knocking. Upon detection of knocking, a retarded ignition control signal for retarding the ignition timing of the engine is generated to thereby suppress the occurrence of knocking. Because the threshold level reflects variations in the vibration level over time or variations in the engine operating state, knocking can be identified with improved reliability. Major portions of the apparatus can be implemented by using a microprocessor, whereby hardware requirement and expenditure can be mitigated significantly.

22 Claims, 6 Drawing Sheets

KNOCKING CONTROL METHOD AND APPARATUS FOR INTERNAL COMBUSTION ENGINE

BACKGROUND OF THE INVENTION

The present invention relates generally to a knocking control method and an apparatus for detecting and suppressing knocking in an internal combustion engine (hereinafter also referred to simply as the engine) such as a gasoline engine for a motor vehicle. More particularly, the invention is concerned with improvements in a knocking control method and an apparatus which can improve controllability of engine operation while assuring reduction in the cost involved in implementation of control hardware.

In general, internal combustion engines such as gasoline engines for motor vehicles include a plurality of cylinders in each of which an air fuel mixture is compressed and combusted at an optimal ignition timing. In this conjunction, there has already been proposed and widely used in practical applications a microcomputer- or microprocessor-based engine control unit (also known as an ECU in abbreviation) for the purpose of optimally controlling the ignition timing as well as the sequence of fuel injections in the individual engine cylinders.

In connection with such engine control, it is known that when the ignition timing (usually given in terms of angular crank position) is controlled to advance excessively, abnormal fuel combustion can take place, resulting in the generation of severe vibrations or shock of the engine cylinder (referred to as knocking) of such a magnitude which may eventually damage or injure the engine. In order to avoid such an unwanted phenomenon, it is necessary to control the ignition timing such that upon detection of abnormal vibrations, the ignition timing is shifted in the direction to afford an appropriate retard to the time point or timing at which the fuel combustion takes place in the engine cylinder.

For a better understanding of the background of the invention, an engine knocking control apparatus known heretofore will be described in some detail with reference to FIG. 6, which is a block diagram showing the general arrangement of the known knocking control apparatus.

In FIG. 6, a reference numeral 1 denotes a knocking sensor installed in association with one or each of the cylinders of an internal combustion engine. The knocking sensor 1 can be constituted by a piezoelectric element or the like component which is capable of detecting knocking in the form of vibrations of the associated cylinder as an electric signal.

The output signal A of the knocking sensor 1 is supplied to a knocking detection circuit, which is generally denoted by a reference numeral 2. The knocking detection circuit 2 is composed of a filter 21 having such a filtering characteristic as to pass therethrough only the frequency components which are peculiar to the vibration phenomenon (e.g., 7 kHz), a gate 22 for allowing the output signal of the filter 21 to periodically pass therethrough at a predetermined timing, a background level (BGL) generator 23 for generating a background level signal BGL on the basis of an output signal A' of the gate 22, a comparator 24 for comparing the output signal A' of the gate 22 with the background level signal BGL to produce an output signal of "ON" level when the gate output level A' exceeds the background level BGL, and an integrator 25 for integrating the output signal of the comparator 24. The output signal of the integrator 25 is then supplied to an analogue to digital (A/D) converter 3 where it is converted to a digital signal $V_R$.

The digital signal $V_R$ is supplied to an engine control unit (ECU) 4 which may be constituted by a microcomputer or microprocessor and which is programmed to perform ignition timing control for the engine cylinders on the basis of the output signal $V_R$ of the A/D converter 3 while supplying a masking pulse signal M to the gate 22 and a reset signal R to the integrator 25, respectively, for the purpose which will be described hereinafter. Further, the ECU 4 includes a controller 4A for controlling the ignition timing of the cylinders. The controller 4A calculates an optimal ignition timing for each cylinder on the basis of the operating condition of the engine under normal combustion therein in the well-known manner as well as an angle of retard for a knocking cylinder on the basis of the digital signal $V_R$ output from the A/D converter 3, so that the optimal ignition timing for the knocking cylinder is to be delayed by the angle of retard for suppressing the knocking. To this end, the controller 4A is designed to produce a control angle signal $\theta R$ based on the optimal ignition timing and the angle of retard for properly controlling the ignition timing and in particular for suppressing knocking when it is taking place.

Next, description will be made of the operation of the knocking control apparatus of FIG. 6, while referring to a waveform diagram shown in FIG. 7.

Normally, in each of the engine cylinders, ignition takes place at a timing corresponding to an crank angle or position which advances approximately by about 5° relative to top dead center (TDC) (which is given by the crank angle of 0) so that explosive combustion of the air fuel mixture may occur at the timing corresponding to a crank angle in a range of about 10° to 60° after TDC. The knocking due to the abnormal combustion will thus take place at the timing falling within the crank angle range of about 10° to 60° after TDC.

Accordingly, upon every occurrence of vibration noise of the cylinder and inter alia knocking, the output signal A of the knocking sensor 1 produced at a corresponding periodical time interval assumes a significantly increased amplitude, as can be seen in the waveform shown in FIG. 7 at (a).

In the meanwhile, the ECU 4 outputs to the gate 22 a masking pulse signal M which is inverted periodically at a predetermined time interval in order to ensure that the knocking detection circuit 2 can receive and efficiently process the sensor output signal A. More specifically, the masking pulse signal M is generated in such a waveform in which the leading edge thereof appears at a crank angle of about 75° before TDC (this advance angle will hereinafter be represented by affixing "B" to the angle value, e.g., by "B75°") while the trailing edge of the masking pulse M approximately corresponds to a time point B5° of 5° before TDC, as can be seen in the waveform shown at (b) in FIG. 7. So long as the masking pulse M assumes a high level, the gate 22 is blocked or disabled. Further, as mentioned previously, a reset signal R is supplied to the integrator 25 from the ECU 4 periodically at a predetermined timing which coincides with the leading edge of the masking pulse signal M.

The filter 21 incorporated in the knocking detection circuit 2 has such a filtering characteristic that the frequency components of the knocking sensor output signal A produced upon occurrence of cylinder or engine vibrations can pass therethrough, while the gate 22 allows the knocking sensor output signal A to pass therethrough only during a period in which the masking pulse signal M is at a low level, as shown at (c) in FIG. 7. On the other hand, the background level generator 23 generates the background level BGL contained in the output signal A' of the gate 22 by discriminatively separating the former from the latter, as is illustrated at (d) in FIG. 7. The background level BGL thus derived serves as a reference signal or threshold for the detection of knocking.

When the gate output signal A' exceeds the background level BGL, the comparator 24 decides that knocking has taken place and produces an output signal of "H" level. The integrator 25 starts to integrate the output signal of the comparator 24 after it is reset by the reset signal R applied thereto from the ECU 4, as illustrated at (e) in FIG. 7. The output signal $V_R$ of the integrator 25 then undergoes A/D conversion by the A/D converter 3, the resulting digital value being then input to the ECU 4.

In this manner, the ECU 4 receives the A/D converted integration value $V_R$ upon every occurrence of ignition and combustion in the engine cylinder, to thereby generate a control signal $\theta_R$ in the form of a retarded control angle signal for controlling the ignition timing in the sense to suppress knocking if it is taking place. To this end, the controller 4A constituting a part of the ECU 4 adds an angle of retard $\delta\theta_R$, which is to be described in detail later, to a current ignition control angle $\theta_R^*$, which is suitable for normal or optimal ignition, thereby to generate a current retarded control angle signal $\theta_R$. Accordingly, the current retarded control angle $\theta_R$ can be given by the following expression:

$$\theta_R = \theta_R^* + \delta\theta_R \tag{1}$$

In expression (1) above, the angle of retard $\delta\theta_R$ is given by the following formula:

$$\delta\theta_R = V_R \times L$$

where L represents a weighting constant.

As will be appreciated from the foregoing, in the case of the known engine knocking control apparatus described above, knocking control is performed by resorting to the use of the knocking detection circuit 2 in combination with the knocking determining or identifying means constituted by the background level generator 23, the comparator 24, the integrator 25 and others. Under the circumstances, the known knocking control apparatus suffers from the following problems: many hardware components are required for knocking control; the entire arrangement of hardware components becomes complicated; and thus, high cost or expenditure is involved in the manufacture of the knocking control apparatus as a whole.

SUMMARY OF THE INVENTION

In view of the state of the art described above, the present invention is intended to overcome the problems of the known knocking control method and apparatus.

It is an object of the present invention to provide an improved engine knocking control method and apparatus which can reduce the number of hardware components as required and simplify the arrangement thereof while enhancing the controllability and flexibility of an engine control unit, and which can be implemented inexpensively and profitably from an economical standpoint.

Another object of the invention is to provide an improved knocking control method and apparatus which can detect knocking in a cylinder with high accuracy and reliability in cases where the level of engine vibrations increases during an extended period of use.

A further object of the invention is to provide an improved knocking control method and apparatus which can detect knocking in a cylinder with high accuracy and reliability even when the engine is in a transitional operating state.

In view of the above and other objects which will become apparent as description proceeds, there is provided, according to a first aspect of the present invention, a method of controlling knocking in an internal combustion engine, comprising steps of: generating a vibration level periodically at a predetermined time interval on the basis of an output signal of a knocking sensor installed for detecting vibrations of the engine; making decision as to whether or not the vibration level exceeds a predetermined value; averaging the vibration level with a first predetermined contribution ratio to provide a first mean value unless the vibration level exceeds the predetermined value; averaging the vibration level with a second predetermined contribution ratio which is less than the first predetermined contribution ratio to provide a second mean value if the vibration level exceeds the predetermined value; generating a threshold level, which is referred to upon making decision as to the occurrence of knocking, on the basis of either one of the first and second mean values; comparing the vibration level with the threshold level for determining whether there is knocking in the engine; and controlling an engine control parameter so as to suppress engine knocking when the vibration level exceeds the threshold level.

According to a second aspect of the invention, there is provided a knocking control apparatus for suppressing knocking in an internal combustion engine, comprising: a knocking sensor for detecting vibrations of the engine and generating a corresponding output signal; a vibration level generator operatively connected to receive the output signal of the knocking sensor for generating a vibration level representing the magnitude of the engine vibrations on the basis of the output signal of the knocking sensor at every predetermined time interval; vibration level determining means operatively connected to the vibration level generator for making decision as to whether the vibration level exceeds a predetermined value; vibration level averaging means operatively connected to the vibration level generator and the vibration level determining means, respectively, the vibration level averaging means being responsive to the output of the vibration level determining means such that it averages the vibration level with a first contribution ratio to provide a first mean value unless the vibration level exceeds the predetermined value, and with a second contribution ratio, which is smaller than the first contribution ratio, to provide a second mean value if the vibration level exceeds the predetermined value; calculating means operatively connected to the vibration level averaging means for generating a threshold level, which is referred to upon making decision as to the occurrence of knocking, on the basis of either one of the first and second mean values; knocking identification means operatively connected to receive outputs of the vibration level generator and the calculating means for comparing the vibration level with the threshold level so that it generates a knocking identification signal if the vibration level exceeds the threshold level; and knocking control means responsive to the knocking identification signal from the knocking identification means for controlling an engine control parameter so that the knocking can be suppressed.

With the above-described knocking control method and apparatus according to the first and second aspects of the invention, variations in the vibration level brought about, for example, by increasing engine vibrations during an extended period of use can satisfactorily be offset or compensated so that knocking can be detected and suppressed with high reliability. More specifically, taking account of the fact that the level of engine vibrations increases over time, it is necessary for the threshold level for determining engine knocking to accordingly increase or reflect the increasing vibration level for accurate determination of knocking. In this case, however, if the vibration level suddenly increases such as when the engine is rapidly accelerating or decelerating, the knock determining threshold also increases to an excessive extent following the increase in the vibration level so that accurate detection of knocking becomes impossible. To avoid this, according to the present invention, if the vibration level is lower than a predetermined value, the vibration level is averaged based on the first contribution or significance ratio so that the threshold level reflects the vibration level to a relatively high extent. On the other hand, when the vibration level exceeds the predetermined value, the vibration level is averaged based on the second contribution or significance ratio which is smaller than the first contribution ratio, so that the threshold level reflects the vibration level to a relatively low extent. The threshold level determined on the basis of an appropriate one of the first and second contribution ratios can thus follow up variations in the vibration level in two different ways, whereby erroneous identification of knocking due to variations in the vibration level during an extended period of use can positively be excluded.

Preferably, the first mean value is determined in accordance with a first formula which follows:

$$BGL1 = BGL1^*(N_1-1)/N_1 + V_P/N_1$$

where
BGL1 represents a current first mean value which is to be obtained from the current averaging processing;
BGL1* represents a previous first mean value which was obtained in a preceding operation cycle;
$N_1$ represents a first predetermined constant; and
$V_P$ represents the vibration level;
while the second mean value is determined in accordance with a second formula which follows:

$$BGL1 = BGL1^*(N_1'-1)/N_1' + V_P/N_1'$$

where $N_1'$ represents a second predetermined constant which is greater than the first predetermined constant $N_1$.

The vibration level determining means, the vibration level averaging means, the calculating means, the knocking identification means and the knocking control means comprise a microcomputer.

According to a third aspect of the invention, there is provided a method of controlling knocking in an internal combustion engine, comprising the steps of: generating a vibration level periodically at a predetermined time interval on the basis of an output signal of a knocking sensor installed for detecting vibrations of the internal combustion engine; making decision as to whether the engine is in a transitional operating state; averaging the vibration level with a first predetermined contribution ratio to provide a first mean value unless the engine is in a transitional operating state; averaging the vibration level with a second predetermined contribution ratio which is greater than the first predetermined contribution ratio to provide a second mean value if the engine is in a transitional operating state; generating a threshold level, which is referred to upon making decision as to the occurrence of knocking, on the basis of either one of the first and second mean values; comparing the vibration level with the threshold level for determining whether there is knocking in the engine; and controlling an engine control parameter so as to suppress engine knocking when the vibration level exceeds the threshold level.

According to a fourth aspect of the invention, there is provided a knocking control apparatus for suppressing knocking in an internal combustion engine, comprising: a knocking sensor for detecting vibrations of the engine and generating a corresponding output signal; a vibration level generator operatively connected to receive the output signal of the knocking sensor for generating a vibration level representing the magnitude of the engine vibrations on the basis of the output signal of the knocking sensor at every predetermined time interval; transitional state determining means operatively connected to the vibration level generator for making decision as to whether or not the engine is in a transitional state; vibration level averaging means operatively connected to the vibration level generator and the transitional state determining means, respectively, the vibration level averaging means being responsive to an output of the transitional state determining means such that it averages the vibration level with a first contribution ratio to provide a first mean value unless the engine is in a transitional operating state, and with a second contribution ratio, which is greater than the first contribution ratio, to provide a second mean value if the engine is in a transitional operating state; calculating means operatively connected to the vibration level averaging means for generating a threshold level, which is referred to upon making decision as to the occurrence of knocking, on the basis of either one of the first and second mean values; knocking identification means operatively connected to receive outputs of the vibration level generator and the calculating means for comparing the vibration level with the threshold level so that it generates a knocking identification signal if the vibration level exceeds the threshold level; and knocking control means responsive to the knocking identification signal from the knocking identification means for controlling an engine control parameter so that the knocking can be suppressed.

With the method and apparatus according to the third and fourth aspects of the invention described above, variations in the vibration level, which take place in a transitional operating state of the engine such as when the engine is rapidly accelerating or decelerating, can satisfactorily be offset or compensated so that knocking can be detected with high reliability. More specifically, when the engine is not in a transitional operating state, the vibration level of engine vibrations as sensed by the knocking sensor is averaged with a first contribution or significance ratio. On the other hand, when the engine is in a transitional operating state in which the level of engine vibrations is greatly affected by a sudden change in the operating state of the engine such as rapid acceleration, rapid deceleration or the like, the vibration level is averaged with a second contribution or significance ratio which is greater than the first contribution ratio, so that the threshold level determined on the basis of the averaged vibration level is set to a higher value than in the steady state operating state of the engine. As a result, the threshold level thus determined can thus reflect variations in the vibration level occurring in the transitional operating state, whereby erroneous identification of knocking can be prevented with improved reliability.

Preferably, the first mean value is determined in accordance with a first expression which follows:

$$BGL1 = BGL1^*(N_3-1)/N_3 + V_P/N_3$$

where
BGL1 represents a current first mean value which is to be obtained from the current averaging processing;
BGL1* represents a previous first mean value which was obtained in a preceding operation cycle;
$N_3$ represents a first predetermined constant; and
$V_P$ represents the vibration level;
while the second mean value is determined in accordance with a second formula which follows:

$$BGL1 = BGL1^*(N_3'-1)/N_3' + V_P/N_3'$$

where $N_3'$ represents a second predetermined constant which is smaller than the first predetermined constant $N_3$.

The transitional state determining means, the vibration level averaging means, the calculating means, the knocking identification means and the knocking control means comprise a microcomputer.

Preferably, the transitional state determining means determines, on the basis of the rate of change in the rotational speed of the engine, whether the engine is in a transitional operating state.

Other objects, advantages and novel features of the present invention will become more readily apparent from the following detailed description of preferred embodiments thereof taken in conjunction with the accompanying drawings.

DESCRIPTION OF THE PREFERRED EMBODIMENTS

Now, the present invention will be described in detail in conjunction with exemplary or preferred embodiments thereof by reference to the accompanying drawings.

Figure 1:
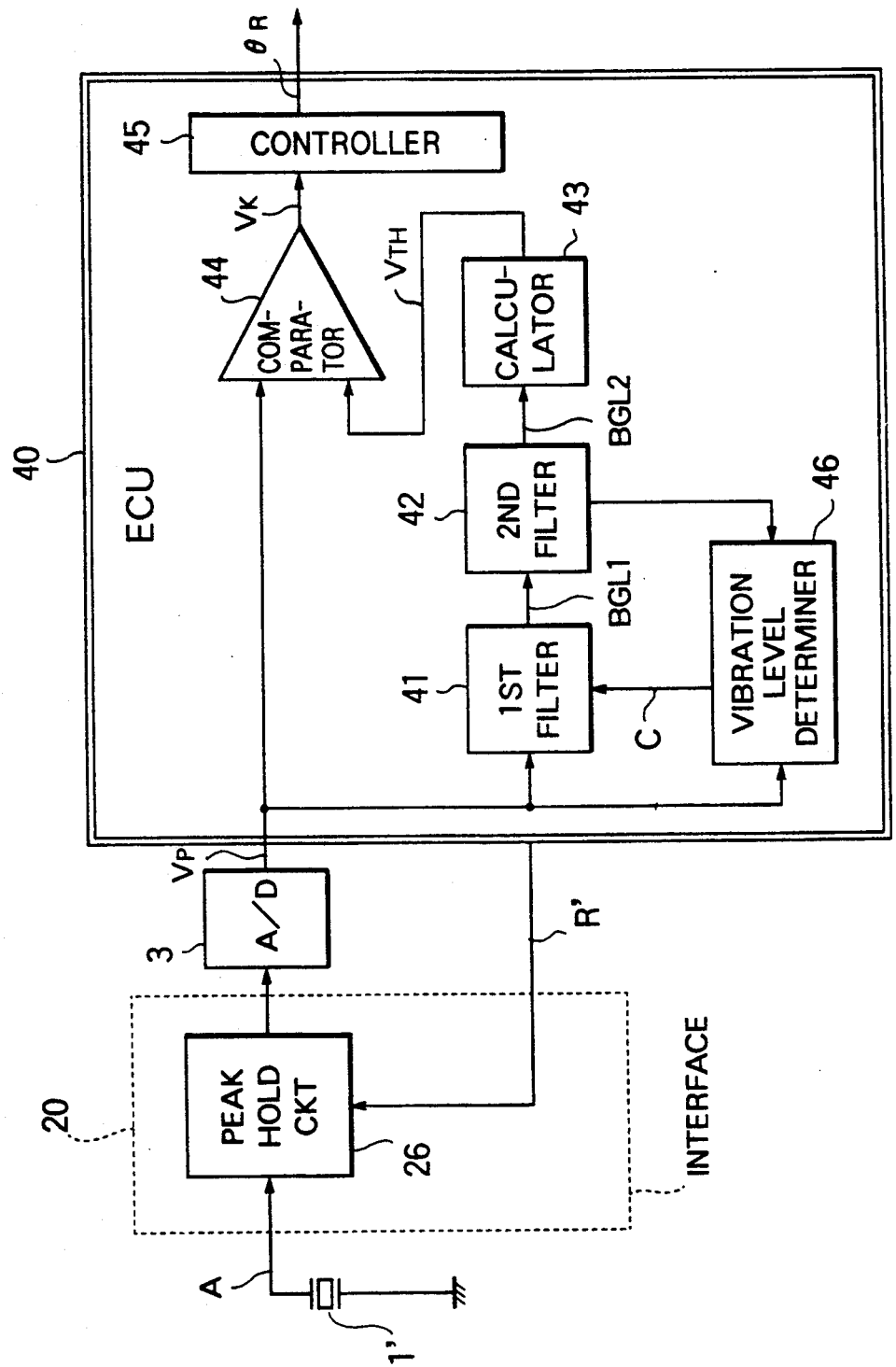
FIG. 1 is a block diagram showing the general arrangement of an internal combustion engine knocking control system according to a first embodiment of the present invention.
Figure 6:
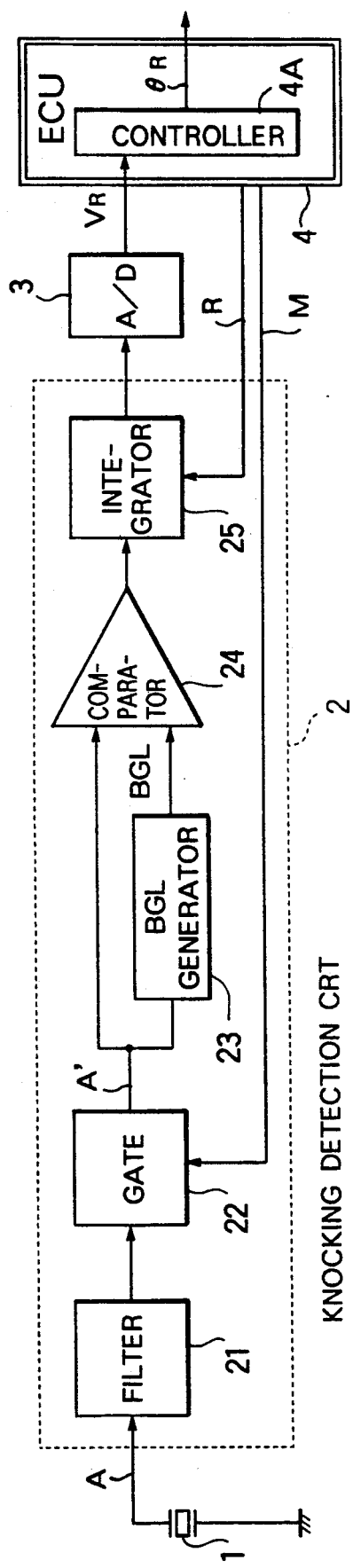
FIG. 6 is a block diagram showing the general arrangement of a known knocking control apparatus.
Figure 7:
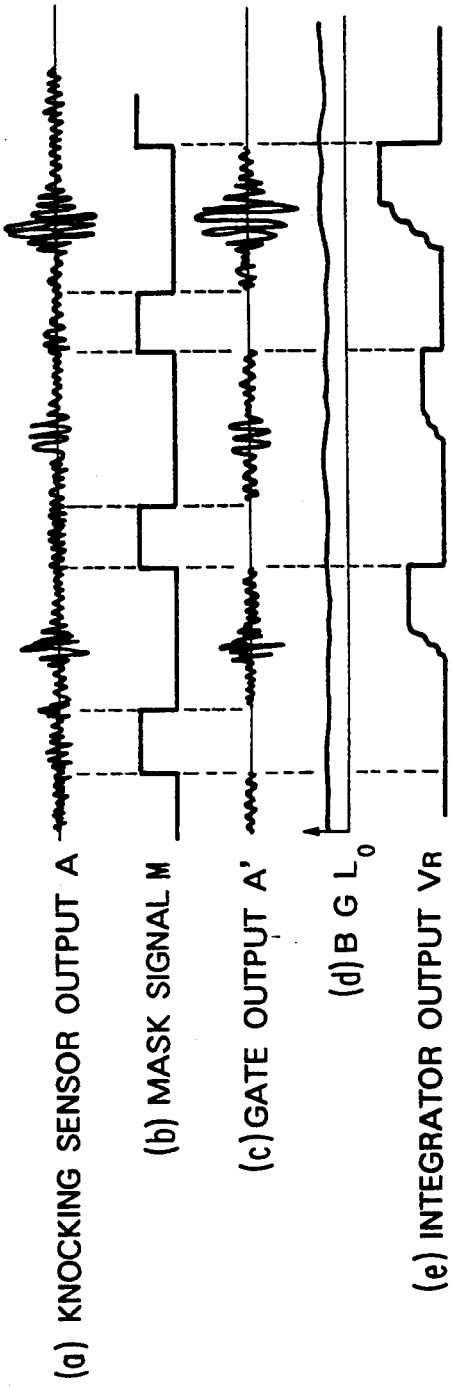
FIG. 7 is a waveform diagram for illustrating the waveforms of signals at various portions of the known knocking control apparatus of FIG. 6.

FIG. 1 shows in a block diagram the general arrangement of a knocking control or suppressing apparatus for an internal combustion engine according to a first embodiment of the invention. In this figure, reference numerals 1' and 3 denote a knocking detection sensor and an analogue-to-digital (A/D) converter, respectively, which serve for similar or the same functions as the corresponding ones of the known apparatus described hereinbefore by reference to FIGS. 6 and 7. Accordingly, repeated description of these parts will be unnecessary. It should, however, be noted that the knocking sensor 1' incorporates therein a filter function for passing frequency components characteristic of cylinder vibrations taking place in the combustion cycle.

Referring to FIG. 1, there is interposed between the knocking sensor 1' and the A/D converter 3 an interface circuit 20 which may be constituted, for example, by a peak hold circuit 26. In this connection, it should be noted that a reset signal R' for resetting the peak hold circuit 26 is generated by an engine control unit (ECU) 40 in the form of a microcomputer. In particular, as shown in the waveform diagram of FIG. 2, the reset signal R' is generated in synchronism with the rotation of the engine and includes a series of square pulses each rising up at a first reference crank angle of B75° (i.e., 75° before TDC) and falling at a second reference crank angle of B5° (i.e., 5° before TDC). The peak hold circuit 26 operates to generate a peak level at the first reference position B75° for each cylinder, wherein the peak level is input to the ECU 40 as a vibration level signal $V_P$ by way of the A/D converter 3.

The engine control unit 40 comprises a first filter 41 for averaging the vibration signal $V_P$ from the A/D converter 3 thereby to generate a first background level signal (hereinafter referred to also as a first mean value signal) BGL1, a second smoothing filter 42 for averaging the first mean value signal BGL1 periodically at a predetermined time interval thereby to generate a second background level signal (also referred to as a second mean value signal) BGL2, a calculator 43 for generating a threshold level signal $V_{TH}$ on the basis of the second mean value signal BGL2, a comparator 44 for generating a knocking identifying signal Vk when the vibration level signal $V_P$ exceeds the threshold level $V_{TH}$, a controller 45 for generating a retarded control angle signal $\theta_R$ for correspondingly retarding the ignition timing for the associated cylinder in response to the knocking identifying signal Vk, and a vibration level determiner 46 for comparing the vibration level signal $V_P$ with a predetermined value derived from the second mean value signal BGL2 thereby to output a filter constant change-over signal C for changing over the filter constant of the first filter 41, which will be described hereinafter in more detail.

Next, referring to the waveform diagram shown in FIG. 2 and the flow chart shown in FIG. 3, description will be made of the operation of the above-mentioned knocking control apparatus of FIG. 1 according to the first embodiment of the invention.

First in Step S1, the knocking sensor 1' detects cyclical vibrations of an associated cylinder of an internal combustion engine and generates an output signal A which is then input to the peak hold circuit 26 of the interface 20 where the knocking sensor output signal A is peak held during periods between successive reset signals from the ECU 40, as described above. The peak level of the knocking sensor output signal A in analogue form thus held is then A/D converted by the A/D converter 3 into a digital vibration level signal $V_P$ which is input to the ECU 40 upon every combustion cycle of the engine cylinder.

Figure 2:
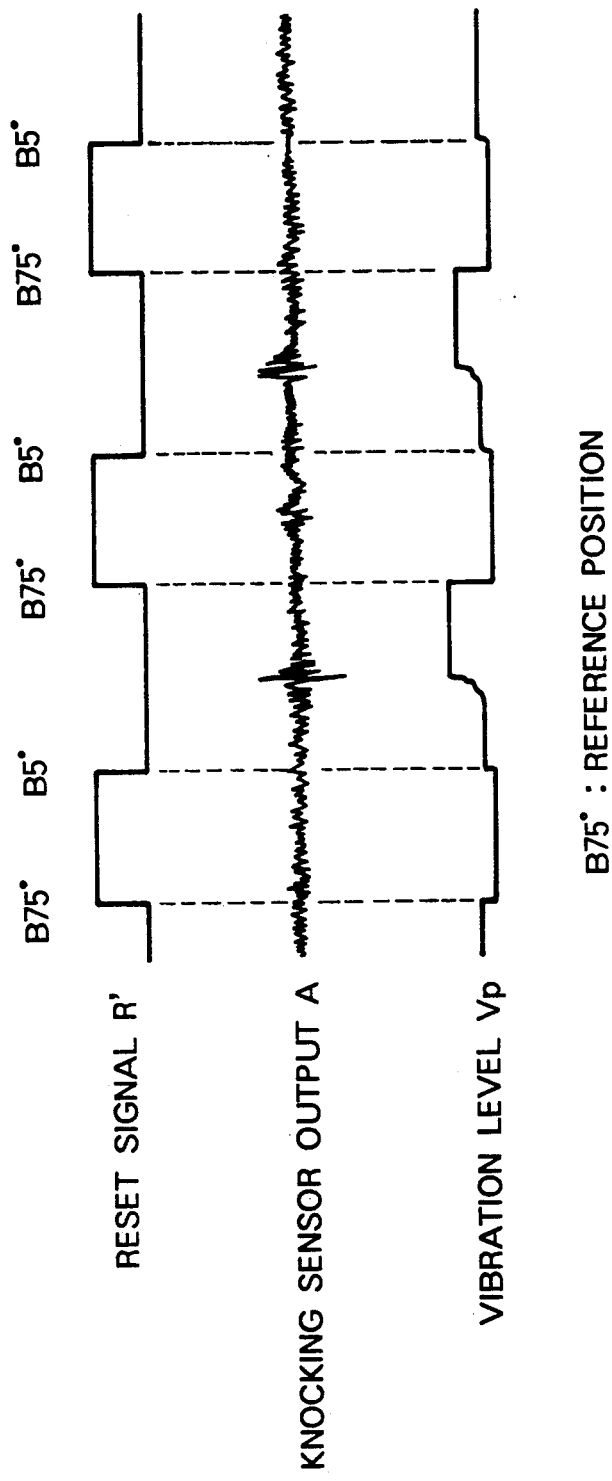
FIG. 2 is a waveform diagram illustrating the waveforms of a reset signal R', a knocking sensor output signal A and a vibration level signal $V_P$ generated by the apparatus of FIG. 1.

Then, in Step S2, upon every sampling of the vibration level signal $V_P$ at the reference position of B75° mentioned previously, the ECU 40 outputs a reset signal R' in the form of a square pulse, as illustrated at in FIG. 2, whereby the peak hold circuit 26 is reset in response to the leading edge of a reset pulse R' at the first reference position B75° of each cylinder (in actuality, slightly delayed relative to the reference position B75°). So long as the reset signal R' remains at a high level, the peak hold circuit 26 continues to be in the reset state and restarts to operate from the time point corresponding to the falling or trailing edge of the reset pulse R' (e.g., at the second reference position B5° of 5° BTDC of each cylinder). In this manner, every time the vibration level signal $V_P$ is produced at the first reference position B75° of each cylinder, the ECU 40 repetitively executes a so-called B75° interrupt processing routine illustrated in FIG. 3.

As can be seen from the bottom waveform shown in FIG. 2, the vibration level signal $V_P$ available at the cylinder reference position B75° is subjected to fluctuations in dependence on variations in the output signal A of the knocking sensor 1'. The variations in the vibration level signal $V_P$ contain not only knocking components but also noise components. Accordingly, in order to positively detect knocking with high reliability while taking into account of a change in the vibration level signal $V_P$ due to gradually increasing engine vibrations during an extended period of use, it is necessary to obtain the background level BGL which follows up the vibration level $V_P$ to some extent. However, in that case, there arises a problem that if the vibration level $V_P$ increases rapidly, knocking detection can no longer be performed accurately with a satisfactory level of reliability. This is because the background level BGL changes in following up or reflecting the vibration level $V_P$, so the threshold level $V_{TH}$ also increases excessively in response to a rapid increase in the vibration level $V_P$, thus making it difficult to perform accurate detection of knocking.

In Step S21, to cope with the above problem, the vibration level determiner 46 first calculates a threshold level TH based on a second mean value BGL2 of the peak vibration level $V_P$ previously determined by the second filter 42, which will be detailed later. For example, the vibration level determiner 46 calculates the threshold level TH using the following formula:

$$TH = G \times BGL2$$

where G is a constant such as, for example, "2". The vibration level determiner 46 then compares the vibration level $V_P$ from the A/D converter 3 with the threshold level TH (i.e., $G \times BGL2$), thereby to decide whether the following condition is satisfied or not.

$$V_P \leq TH = G \times BGL2 \qquad (2).$$

If the vibration level $V_P$ is equal to or less than the threshold level TH (i.e., the above-mentioned condition (2) is satisfied), the vibration level determiner 46 does not produce a filter constant change-over signal C. In this case, in Step S3, the first filter 41 averages the vibration level signal $V_P$ on the basis of a predetermined constant $N_1$ to generate a first mean value signal BGL1 in accordance with the following formula:

$$BGL1 = BGL1^* (N_1 - 1)/N_1 + V_P/N_1 \qquad (3)$$

where BGL1* represents a previous first mean value determined in the preceding cycle or sampling.

On the other hand, when the vibration level $V_P$ is greater than the threshold level TH (i.e., the condition given by formula (2) above is not satisfied), the vibration level determiner 46 outputs a filter constant change-over signal C to the first filter 41 where the constant $N_1$ appearing in formula (3) above is changed into a constant $N_1'$ which is greater than $N_1$.

Thus, In Step S31, the first filter 41 averages the vibration level $V_P$ on the basis of the new constant $N_1'$ and generates a first mean level value BGL1 which is given by the following formula:

$$BGL1 = BGL1^* (N_1' - 1)/N_1' + V_P/N_1' \qquad (4).$$

As will be understood from formulae (3) and (4) above, the first mean value BGL1 currently determined is shifted or updated to a value reflecting the currently detected vibration level based on the previous first mean value BGL1* determined in the preceding sampling cycle. In this manner, the first mean value BGL1* is updated upon every cycle of cylinder vibration detection. The filter constant $N_1$ in formula (3) above, which determines a proportion or ratio (i.e., a contribution or significance ratio also referred to as a reflection ratio) at which the vibration level $V_P$ is reflected or taken into account in determining the first mean value BGL1, is usually set equal to about "8". However, when it is desired to increase the trend of the first mean value BGL1 following up the vibration level $V_P$, this can be accomplished by selecting the filter constant $N_1$ to be a smaller value. In that case, the filter constant $N_1'$ in formula (4) above may be set, for example, to a value at least twice as large as that of the filter constant $N_1$.

On the other hand, the second filter 42 is so designed as to perform a timer interrupt processing routine at every predetermined time interval thereby to execute a further averaging operation on the first mean value BGL1 output from the first filter 41. Thus, in Step S3', the second filter 42 calculates a second mean value BGL2 using the following formula:

$$BGL2 = BGL2^* (N_2 - 1)/N_2 + BGL1/N_2 \qquad (5)$$

where BGL2* represents a previous second mean value obtained in the preceding cycle, and $N_2$ represents a predetermined second averaging constant (a second filter constant).

As will be understood from formula (5) above, the currently determined second mean value BGL2 corresponds to the preceding one BGL2* which has been shifted or updated so as to reflect the current first mean value BGL1, and it is rewritten at every cycle. The constant $N_2$ may be set at a given value which can empirically be determined. Through the averaging operation in Step S3′, there can be obtained the second mean value signal BGL2 which can assume a substantially stabilized value to which variations in the vibration level signal $V_P$ have little or limited contribution.

Subsequent to the timer interrupt processing routine as mentioned above, in Step S4, the calculator 43 properly amplifies the second mean value signal BGL2 and adds thereto an offset $V_{OF}$ to ultimately determine a final threshold level $V_{TH}$ which is referred to upon making a decision as to the occurrence of knocking. To this end, the calculator 43 is designed to perform the following arithmetic operation:

$$V_{TH} = K \times BGL2 + V_{OF} \quad (6)$$

where K represents an amplification factor and $V_{OF}$ represents an offset. In this regard, the second mean value BGL2 is sufficiently smoothed, so the reflection or influence of variations in the vibration level signal $V_P$ on the final threshold level $V_{TH}$, which is obtained from formula (6) above, can satisfactorily be suppressed and hence the threshold level $V_{TH}$ can be a value of high reliability.

Subsequently, in Step S5, the comparator 44 constituting a knocking detecting or identifying means compares the vibration level signal $V_P$ with the threshold level signal $V_{TH}$ to determine a difference Vk between the levels $V_P$ and $V_{TH}$, which difference is given by the following formula:

$$Vk = V_P - V_{TH}.$$

Thereafter, in Step S6, decision is made as to whether the difference Vk is a positive value or not. If the vibration level $V_P$ exceeds the threshold level $V_{TH}$ (i.e., Vk>0), then the comparator 44 generates an output signal Vk as a knocking identification signal indicating the occurrence of knocking.

In response to the generation of the knocking identification signal Vk, in Step S7, the controller 45 arithmetically determines an angle of retard $\delta\theta_R$ required for suppressing the knocking in accordance with the following formula:

$$\delta\theta_R = (Vk/V_{TH}) \times L' \quad (7)$$

where L′ represents a weighting constant.

As will be understood from formula (7) above, the angle of retard $\delta\theta_R$ is arithmetically determined in terms of the ratio of the knocking identification signal Vk to the threshold level $V_{TH}$, so the angle of retard $\delta\theta_R$ can always be of a correct or appropriate value irrespective of variations in the vibration level $V_P$ itself due to gradually increasing engine vibrations over time.

Further, in Step S8, the controller 45 arithmetically determines a control angle $\theta_R$ on the basis of the angle of retard $\delta\theta_R$ using the previously mentioned formula (1), so that the ignition timing is properly retarded for suppressing the knocking. The formula (1) is again expressed for the sake of convenience as follows:

$$\theta_R = \theta_R^* + \delta\theta_R \quad (1)$$

where $\theta_R^*$ represents a current optimal ignition control angle suitable for optimal or normal ignition when there is no knocking.

On the other hand, if it is decided in Step S6 that Vk≦0 as a result of the comparison mentioned previously, indicating that the vibration level $V_P$ does not exceed the threshold level $V_{TH}$, the comparator 44 generates no knocking identification signal Vk. Consequently, in Step S9, the angle of retard $\delta\theta_R$ becomes zero, so the controller 45 generates a control angle signal $\theta_R$ which is equal to a current optimal ignition control angle $\theta_R^*$ suitable for optimal or normal ignition.

In this manner, the ignition timing for the cylinder subjected to the knocking control is corrected or modified by the retarded control angle signal $\theta_R$ in the sense in which the ignition timing is retarded, whereby the occurrence of knocking can satisfactorily be suppressed.

In the case of the first embodiment of the knocking control apparatus described above, only the peak hold circuit 26 other than the A/D converter 3 is implemented as discrete hardware, while all the other components as required for knocking detection and control are incorporated in the ECU 40 in the form of a microprocessor or microcomputer. By virtue of this structure, the number of hardware components as required is significantly reduced so that flexibility or freedom in control of the apparatus as a whole can be enhanced. In addition, the manufacturing cost of the apparatus can accordingly be decreased.

Figure 4:
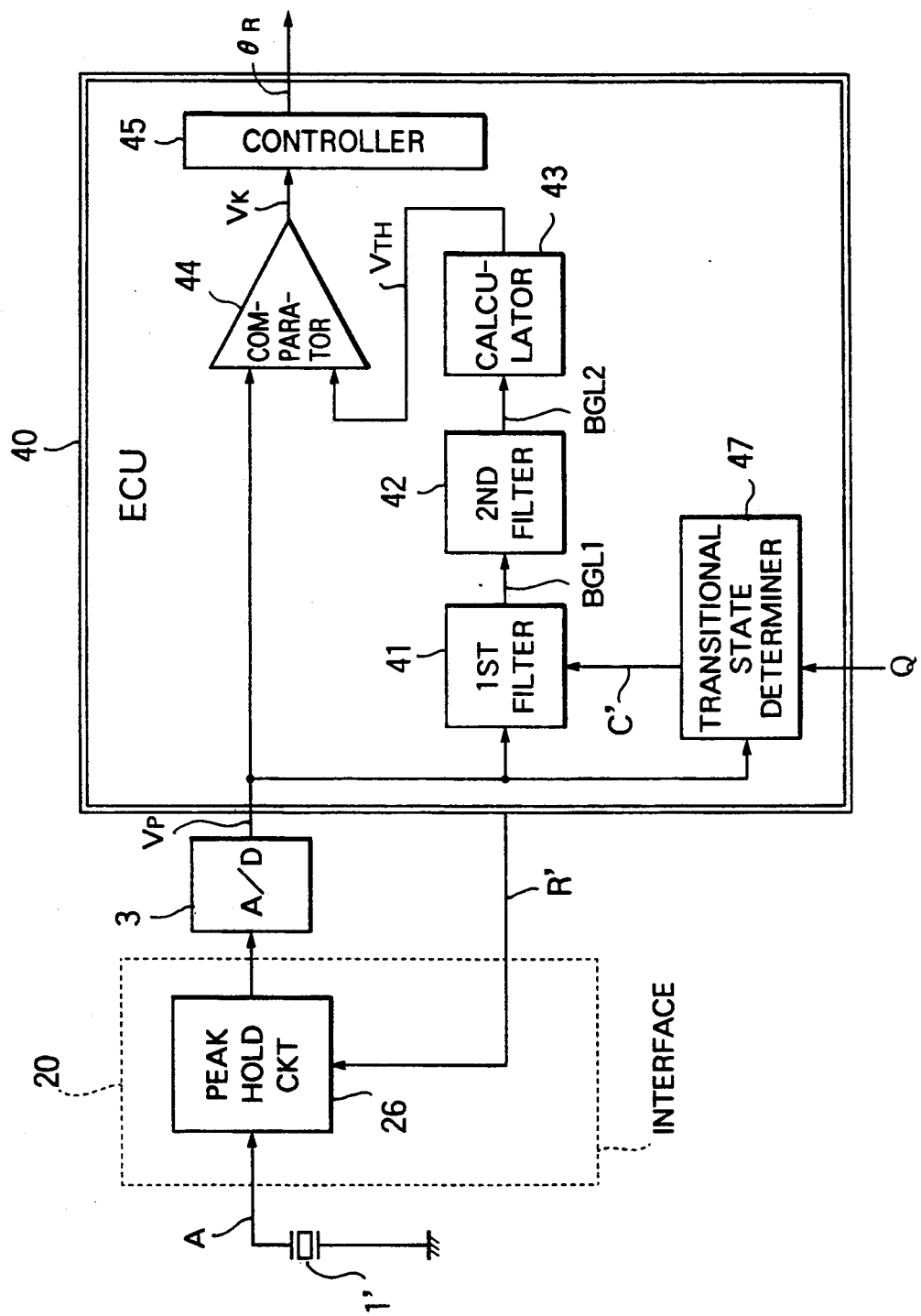
FIG. 4 is a view similar to FIG. 1, but showing a second embodiment of the present invention.
Figure 5:
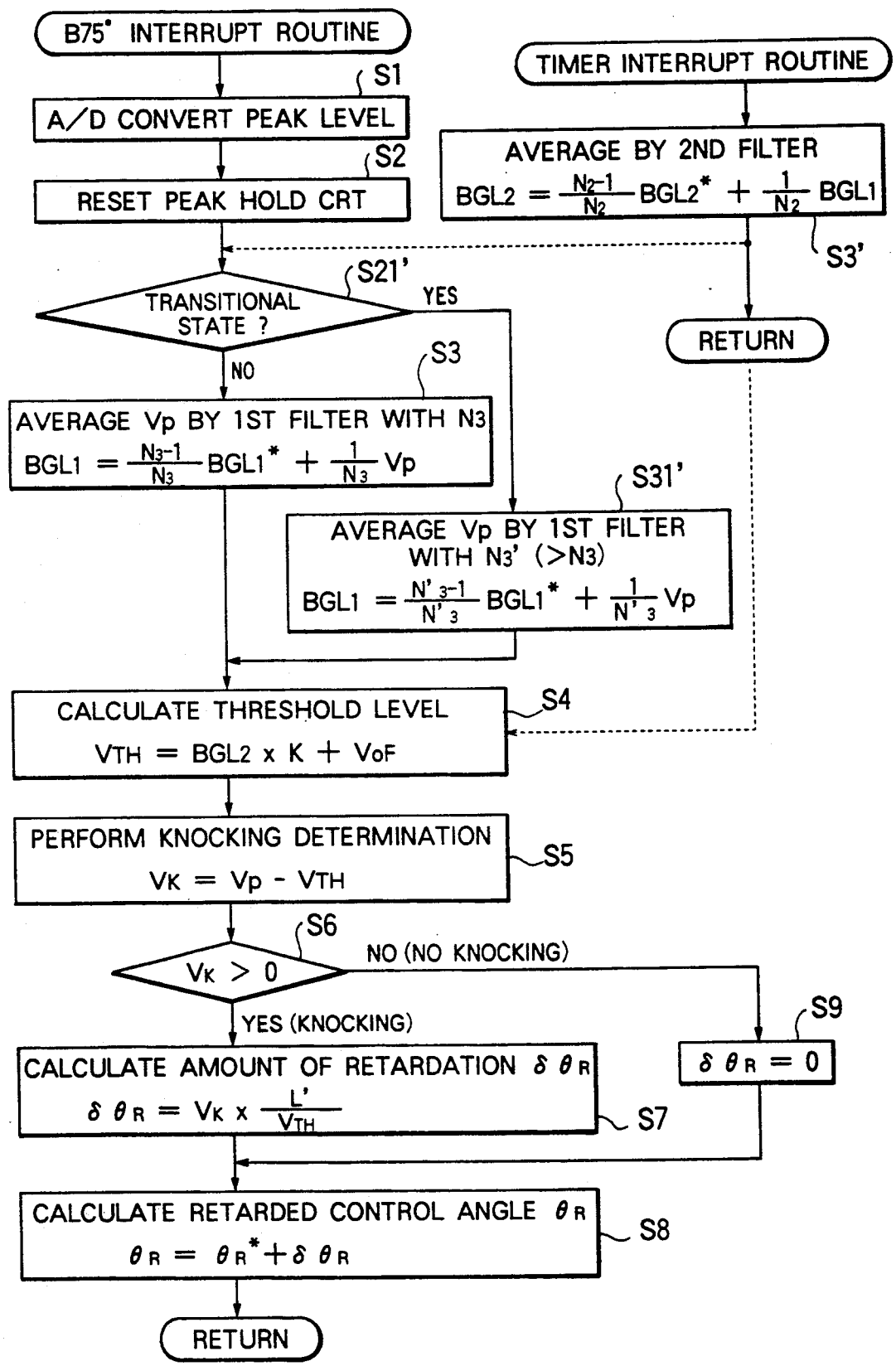
FIG. 5 is a flow chart for illustrating a knocking control procedure carried out by the apparatus of FIG. 4.

Next, description will be made of a second embodiment of the knocking control apparatus according to the invention with reference to FIGS. 4 and 5, in which FIG. 4 shows the general arrangement of the second embodiment and FIG. 5 is a flow chart for illustrating the operation thereof.

Before entering into a detailed description of the second embodiment, it should first be noted that the magnitude of vibrations of the engine cylinder and hence the vibration level $V_P$ varies in dependence on the engine operation state. More specifically, in the steady state of engine operation, the vibration level $V_P$ undergoes little fluctuations or variations, while in a transitional operating state such as rapid acceleration or deceleration, the vibration level $V_P$ is susceptible to significant variations, which in turn means that the threshold level $V_{TH}$ should vary in dependence on the engine operation states in order to evade erroneous knocking identification. The second embodiment of the knocking control apparatus is designed to operate by taking into consideration this fact.

Now, referring to FIG. 4, the knocking control apparatus of this embodiment differs from the previous embodiment of FIG. 1 in that the vibration level determiner 46 is replaced by a transitional state determiner 47. All the other components are substantially the same as those employed in FIG. 1, and a repeated description thereof is therefore omitted. The transitional state determiner 47 is so arranged as to change over the filter constant of the first filter 41 in dependence on the rate of change in the rotational speed Q or the number of revolutions per minute of the engine. Needless to say, a high rate of change in the engine rotational speed Q indicates that the engine is in the transitional state. A signal representing the engine rotational speed Q can be generated by a conventional tachometer or the like element.

Figure 3:
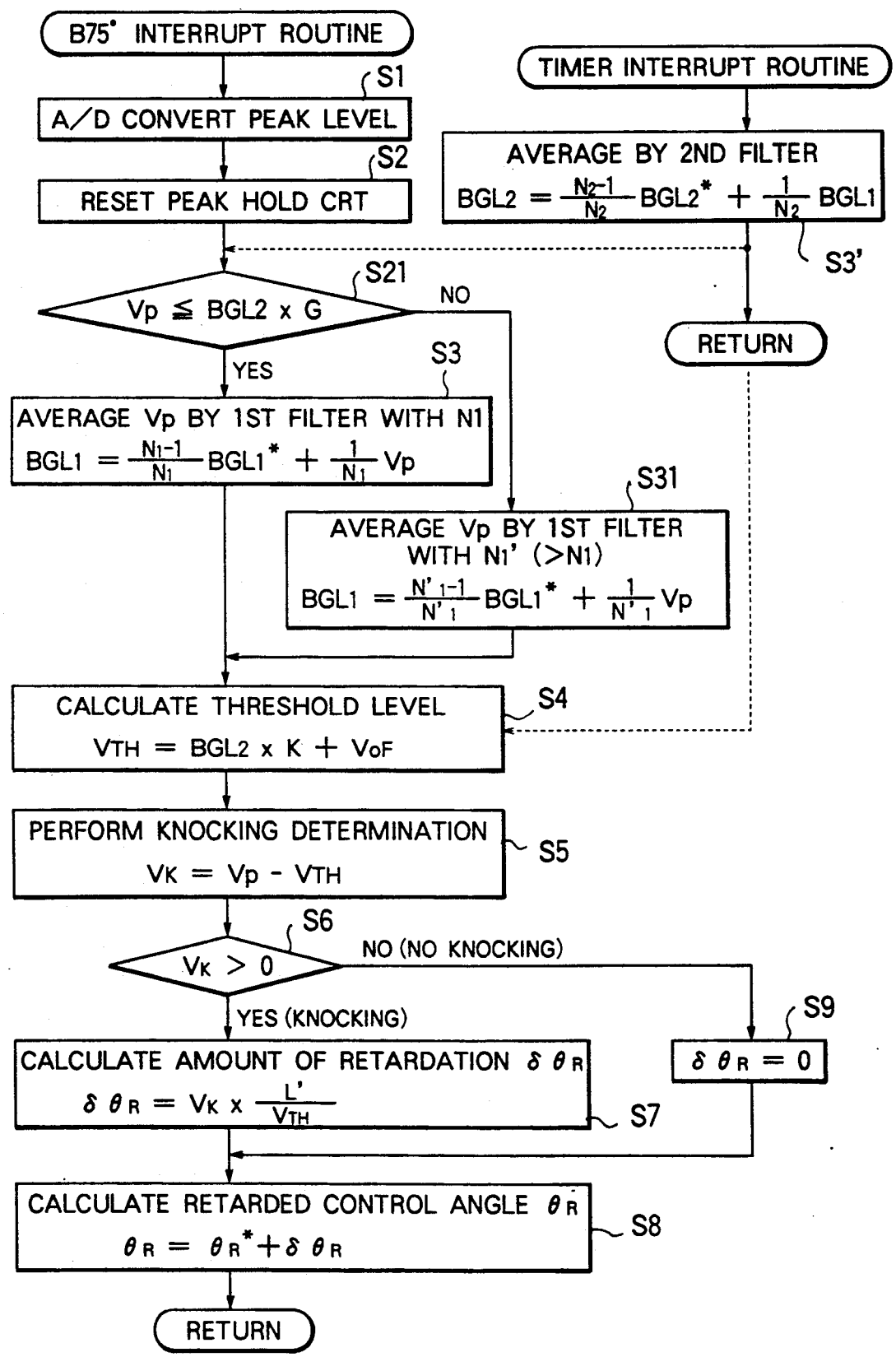
FIG. 3 is a flow chart for illustrating a knocking control procedure carried out by the apparatus of FIG. 1.

Referring to FIG. 5, the knocking control procedure according to the second embodiment of the invention is similar to that of the first embodiment illustrated in the flow chart of FIG. 3 except for Steps S21', S3' and S31'. Accordingly, the following description will be made with emphasis being put on the processings in these steps, while the other processing steps will be apparent from the description made hereinbefore with reference to FIG. 3.

Referring to FIG. 5, in S21', the transitional state determiner 47 makes a decision on the basis of the signal Q representing the engine rotation speed or the number of revolutions per minute of the engine as to whether the engine is in the transitional operating state. If the answer in this decision step S21' is negative (i.e., the engine is in the steady state operation), the transitional state determiner 47 outputs no change-over signal C'. Accordingly, in Step S3, the first filter circuit 41 averages the vibration level signal $V_P$ on the basis of a predetermined constant $N_3$ thereby to generate a first mean value signal BGL1 in accordance with the following formula:

$$BGL1 = BGL1^*(N_3-1)/N_3 + V_P/N_3 \qquad (8).$$

On the other hand, if the answer in Step S21' is positive (i.e., the engine is in the transitional operating state), the determiner 47 outputs a filter constant change-over signal C' for changing over the constant $N_3$ in formula (8) above to a new constant $N_3'$ which is smaller than $N_3$.

Thus, in Step S31', the first filter 41 performs the processing for averaging the vibration level $V_P$ on the basis of the constant $N_3'$ thereby to output a mean level value BGL1 given by the following formula:

$$BGL1 = BGL1^*(N_3'-1)/N_3' + V_P/N_3' \qquad (9).$$

As will be understood from formula (9) above, the first mean value BGL1 currently determined is shifted or updated to a value reflecting the currently detected engine operation state based on the first mean value BGL1* determined in the preceding sampling or cycle. In this manner, the first mean value BGL1* is updated in dependence on the engine operation state, i.e., steady state or transitional state. The filter constant $N_3$ in formula (8) above, which determines the proportion or ratio at which the vibration level $V_P$ is reflected or taken into account (i.e., contribution or significance ratio) in determining the average value, is usually set equal to about "8", while $N_3'$ in formula (9) above is selected to be about "4". In other words, in the steady state operation of the engine, the ratio of contribution of the vibration level $V_P$ to the first mean value BGL1 is about $\frac{1}{8}$, while in the transitional operating state, the contribution ratio is about $\frac{1}{4}$.

The subsequent processing steps S4, S5, S6, S7, S8 and S9 are same as those shown in FIG. 3, a repeated description of which will be unnecessary.

As will be appreciated from the foregoing, according to the second embodiment of the invention, the threshold level $V_{TH}$ applied to one input terminal of the comparator 44 is controllably varied so as to rapidly reflect the engine operation state, whereby the occurrence of knocking can be detected or identified with enhanced reliability even in the transitional operating state of the engine.

Further, similar advantages as those of the first embodiment mentioned hereinbefore can be achieved in respect to the hardware structure, cost, flexibility or freedom in control and others.

In the above description of the second embodiment, it has been assumed that the engine operation states are discriminated on the basis of the engine rotational speed Q or the number of revolutions per minute of the engine. In this conjunction, it should be added that discrimination of the engine operation states may equally be effected on the basis of the vibration level $V_P$. More specifically, in the steady engine operation state, the vibration level $V_P$ fluctuates less significantly around the second mean value BGL2, while in the transitional state such as rapid acceleration or deceleration, the vibration level $V_P$ remains significantly higher or lower than the mean value continuously over a corresponding time span. Thus, the transitional state can discriminatively be identified by detecting the state of the vibration level $V_P$ in which it remains higher or lower than the mean value BGL2 successively for a predetermined number of cycles. To this end, the vibration level determiner 46 shown in FIG. 1 may be employed with some change in design as required.

In both of the exemplary embodiments of the knocking control apparatus described above, the interface circuit 20 for generating the vibration level signal $V_P$ is constituted by the peak hold circuit 26. However, it goes without saying that the interface circuit 20 may equally be constituted by an integrator or the like with substantially the same effects.

Further, although such arrangement is adopted in both of the illustrated embodiments that the difference Vk between the vibration level signal $V_P$ and the threshold level $V_{TH}$ is output from the comparator 44 as the knocking identification signal, it should be understood that the comparator 44 may be so configured as to simply produce an output signal of a high level when the vibration level $V_P$ exceeds the threshold level $V_{TH}$.

Although it has been described that the second mean value BGL2 is utilized for generating the threshold level $V_{TH}$, it should be understood that the first mean value BGL1 may be used in place of the second mean value BGL2 so far as the vibration level $V_P$ can be smoothed by the first filter 41 to an extent enough to allow the first mean value BGL1 to be used for generating the threshold level $V_{TH}$. In that case, the second filter 42 may be spared, needless to say.

Further, in conjunction with the first embodiment of the invention, it should be mentioned that the filter constant $N_1'$ which determines the contribution ratio of the vibration level $V_P$ to the mean value BGL1 may rather arbitrarily be set to a given value as occasion requires. By way of example, when the filter constant $N_1'$ is set to be infinite (i.e. $N_1' = \alpha$), then the formula (4) can be rewritten as follows:

$$BGL1 = BGL1^*.$$

It is thus apparent that the mean value output from the first filter 41 and hence that of the second filter 42 is inhibited from following up the vibration level $V_P$ even when it corresponds to a noise level or knocking level. In this case, when the vibration level $V_P$ is high, execution of the processing at Step S3 is skipped. Accordingly, the processing step S3 can then be spared.

The foregoing description has been made on the assumption that the ignition timing is controlled to suppress the knocking. It should however be understood that other engine operating parameters may be controlled to this end.

While the invention has been described in terms of its preferred embodiments, it should be understood that numerous modifications may be made thereto without departing from the spirit and scope of the invention as defined in the appended claims.

What is claimed is:

1. A method of controlling knocking in an internal combustion engine, comprising the steps of:
   generating a vibration level periodically at a predetermined time interval on the basis of an output signal of a knocking sensor installed for detecting vibrations of said engine;
   making a decision as to whether or not said vibration level exceeds a predetermined value;
   averaging said vibration level in accordance with a first predetermined constant defining a first vibration level significance ratio to provide a first mean value unless said vibration level exceeds said predetermined value;
   averaging said vibration level in accordance with a second predetermined constant defining a second vibration level significance ratio which is less than said first predetermined significance ratio to provide a second mean value if said vibration level exceeds said predetermined value;
   generating a threshold level, which is referred to upon making a decision as to the occurrence of knocking, on the basis of either one of said first and second mean values;
   comparing said vibration level with said threshold level to determine whether there is knocking in the engine; and
   controlling an engine control parameter so as to suppress engine knocking when said vibration level exceeds said threshold level.

2. An engine knocking control method according to claim 1, wherein unless said vibration level exceeds said predetermined value, said vibration level is averaged on the basis of said first predetermined constant in accordance with a first formula which follows:

$$BGL1 = BGL1^{*}(N_1-1)/N_1 + V_P/N_1$$

where
   BGL1 represents a current first mean value which is to be obtained from the current averaging processing;
   BGL1* represents a previous first mean value which was obtained in a preceding operation cycle;
   $N_1$ represents said first predetermined constant; and
   $V_P$ represents said vibration level;
while if said vibration level exceeds said predetermined value, said vibration level is averaged on the basis of said second predetermined constant, which is greater than said first predetermined constant, in accordance with a second formula which follows:

$$BGL1 = BGL1^{*}(N_1'-1)/N_1' + V_P/N_1'$$

where $N_1'$ represents said second predetermined constant.

3. An engine knocking control method according to claim 1, wherein said engine control parameter is an ignition timing which is retarded to suppress the occurrence of knocking when said vibration level exceeds said threshold level.

4. A knocking control apparatus for suppressing knocking in an internal combustion engine, comprising:
   a knocking sensor for detecting vibrations of said engine and generating a corresponding output signal;
   a vibration level generator operatively connected to receive the output signal of said knocking sensor for generating a vibration level representing the magnitude of said engine vibrations on the basis of the output signal of said knocking sensor at every predetermined time interval;
   vibration level determining means operatively connected to said vibration level generator for making a decision as to whether or not said vibration level exceeds a predetermined value;
   vibration level averaging means operatively connected to said vibration level generator and said vibration level determining means, respectively, said vibration level averaging means being responsive to the output of said vibration level determining means such that it averages said vibration level in accordance with a first predetermined constant defining a first vibration level significance ratio to provide a first means value unless said vibration level exceeds said predetermined value, and with a second predetermined constant defining a second vibration level significance ratio, which is smaller than said first significance ratio, to provide a second mean value if said vibration level exceeds said predetermined value;
   calculating means operatively connected to said vibration level averaging means for generating a threshold level, which is referred to upon making a decision as to the occurrence of knocking, on the basis of either one of said first and second mean values;
   knocking identification means operatively connected to receive outputs of said vibration level generator and said calculating means for comparing said vibration level with said threshold level so that it generates a knocking identification signal if said vibration level exceeds said threshold level; and
   knocking control means responsive to the knocking identification signal from said knocking identification means for controlling an engine control parameter so that said knocking can 5. An engine knocking control apparatus according to claim 4, wherein said first mean value is determined in accordance with a first formula which follows:

$$BGL1 = BGL1^{*}(N_1-1)/N_1 + V_P/N_1$$

where
   BGL1 represents a current first mean value which is to be obtained from the current averaging processing;
   BGL1* represents a previous first mean value which was obtained in a preceding operation cycle;
   $N_1$ represents said first predetermined constant; and
   $V_P$ represents said vibration level;
while said second mean value is determined in accordance with a second formula which follows:

$$BGL1 = BGL1^*(N_1'-1)/N_1' + V_P/N_1'$$

where $N_1'$ represents said second predetermined constant which is greater than said first predetermined constant $N_1$.

6. An engine knocking control apparatus according to claim 4, wherein said engine control parameter is an ignition timing which is retarded to suppress the occurrence of knocking when said vibration level exceeds said threshold level.

7. An engine knocking control apparatus according to claim 4, wherein said vibration level averaging means includes at least one filter having filter constants corresponding to said first and second predetermined constants, respectively, which can be changed over in response to the output of said vibration level determining means.

8. An engine knocking control apparatus according to claim 4, wherein said vibration level generator comprises a peak hold circuit which is enabled periodically in synchronism with engine cycles to thereby hold and output a vibration signal representing a peak value of vibrations of said engine which take place upon every occurrence of combustion therein.

9. An engine knocking control apparatus according to claim 4, wherein said vibration level determining means, said vibration level averaging means, said calculating means, said knocking identification means and said knocking control means comprise a microcomputer.

10. An engine knocking control apparatus according to claim 4, wherein said knocking control means retards said ignition timing by an amount corresponding to a quotient resulting from a division of a difference between said threshold level and said vibration level by said threshold level.

11. A method of controlling knocking in an internal combustion engine, comprising the steps of:
generating a vibration level periodically at a predetermined time interval on the basis of an output signal of a knocking sensor installed for detecting vibrations of said internal combustion engine;
making a decision as to whether or not said engine is in a transitional operating state;
averaging said vibration level in accordance with a first predetermined constant defining a first vibration level significance ratio to provide a first mean value unless said engine is in a transitional operating state;
averaging said vibration level in accordance with a second predetermined constant defining a second vibration level significance ratio which is greater than said first predetermined significance ratio to provide a second mean value if said engine is in a transitional operating state;
generating a threshold level, which is referred to upon making a decision as to the occurrence of knocking, on the basis of either one of the first and second mean values;
comparing said vibration level with said threshold level to determine whether there is knocking in the engine; and
controlling an engine control parameter so as to suppress engine knocking when said vibration level exceeds said threshold level.

12. An engine knocking control method according to claim 11, wherein unless said engine is in a transitional operating state, said vibration level is averaged on the basis of said first predetermined constant in accordance with a first formula which follows:

$$BGL1 = BGL1^*(N_3-1)/N_3 + V_P/N_3$$

where
BGL1 represents a current first mean value which is to be obtained from the current averaging processing;
BGL1* represents a previous first mean value which was obtained in a preceding operation cycle;
$N_3$ represents said first predetermined constant; and
$V_P$ represents said vibration level;
while if said vibration level is in a transitional operating state, said vibration level is averaged on the basis of said second predetermined constant, which is smaller than said first predetermined constant, in accordance with a second formula which follows:

$$BGL1 = BGL1^*(N_3'-1)/N_3' + V_P/N_3'$$

where $N_3'$ represents said second predetermined constant.

13. An engine knocking control method according to claim 11, wherein said engine control parameter is an ignition timing which is retarded to suppress the occurrence of knocking when said vibration level exceeds said threshold level.

14. An engine knocking control method according to claim 11, wherein the determination as to whether or not said engine is in a transitional operating state is made on the basis of the rate of change in the rotational speed of said engine.

15. A knocking control apparatus for suppressing knocking in an internal combustion engine, comprising:
a knocking sensor for detecting vibrations of said engine and generating a corresponding output signal;
a vibration level generator operatively connected to receive the output signal of said knocking sensor for generating a vibration level representing the magnitude of said engine vibrations on the basis of the output signal of said knocking sensor at every predetermined time interval;
transitional state determining means operatively connected to said vibration level generator for making a decision as to whether or not said engine is in a transitional state;
vibration level averaging means operatively connected to said vibration level generator and said transitional state determining means, respectively, said vibration level averaging means being responsive to an output of said transitional state determining means such that it averages said vibration level in accordance with a first predetermined constant defining a first vibration level significance ratio to provide a first mean value unless said engine is in a transitional operating state, and in accordance with a second predetermined constant defining a second vibration level significance ratio, which is greater than said first significance ratio, to provide a second mean value if said engine is in a transitional operating state;
calculating means operatively connected to said vibration level averaging means for generating a threshold level, which is referred to upon making a decision as to the occurrence of knocking, on the basis of either one of said first and second mean values;

knocking identification means operatively connected to receive outputs of said vibration level generator and said calculating means for comparing said vibration level with said threshold level so that it generates a knocking identification signal if said vibration level exceeds said threshold level; and knocking control means responsive to the knocking identification signal from said knocking identification means for controlling an engine control parameter so that said knocking can be suppressed.

16. An engine knocking control apparatus according to claim 15, wherein said first mean value is determined in accordance with a first expression which follows:

$$BGL1 = BGL1^*(N_3-1)/N_3 + V_P/N_3$$

where
BGL1 represents a current first mean value which is to be obtained from the current averaging processing;
BGL1* represents a previous first mean value which was obtained in a preceding operation cycle;
$N_3$ represents said first predetermined constant; and
$V_P$ represents said vibration level;
while said second mean value is determined in accordance with a second formula which follows:

$$BGL1 = BGL1^*(N_3'-1)/N_3' + V_P/N_3'$$

where $N_3'$ represents said second predetermined constant which is smaller than said first predetermined constant $N_3$.

17. An engine knocking control apparatus according to claim 15, wherein said engine control parameter is an ignition timing which is retarded to suppress the occurrence of knocking when said vibration level exceeds said threshold level.

18. An engine knocking control apparatus according to claim 15, wherein said vibration level averaging means includes at least one filter having filter constants corresponding to said first and second predetermined constants, respectively, which are changed over in response to the output of said transitional state determining means.

19. An engine knocking control apparatus according to claim 15, wherein said vibration level generator includes a peak hold circuit which is enabled periodically in synchronism with engine cycles to thereby hold and output a vibration signal representing a peak level of vibrations of said engine cylinder which take place upon every occurrence of combustion therein.

20. An engine knocking control apparatus according to claim 15, wherein said transitional state determining means, said vibration level averaging means, said calculating means, said knocking identification means and said knocking control means comprise a microcomputer.

21. An engine knocking control apparatus according to claim 15, wherein said knocking control means retards said ignition timing by an amount corresponding to a quotient resulting from a division of a difference between said threshold level and said vibration level by said threshold level.

22. An engine knocking control apparatus according to claim 15, wherein said transitional state determining means determines, on the basis of the rate of change in the rotational speed of said engine, whether or not said engine is in a transitional operating state.

* * * * *